May 18, 1954  F. A. GUENU ET AL  2,678,572
CENTERING MACHINE
Filed May 17, 1950
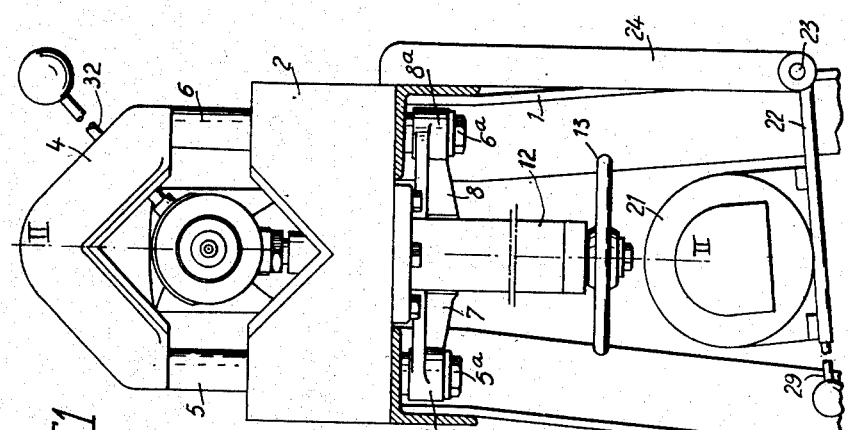
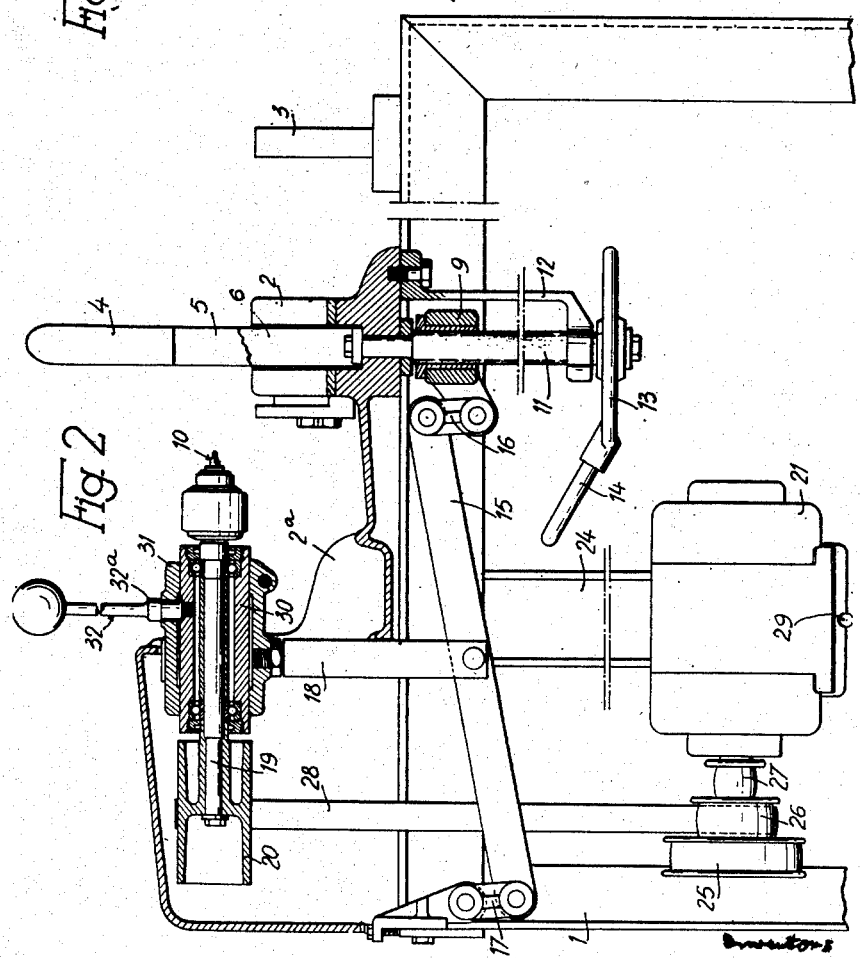

Patented May 18, 1954

2,678,572

UNITED STATES PATENT OFFICE 2,678,572

CENTERING MACHINE

Fernand André Guenu and Jean Ollivier,
Saint-Ouen, France

Application May 17, 1950, Serial No. 162,453

Claims priority, application France May 20, 1949

6 Claims. (Cl. 77—18)

The present invention has for its object a centering machine for making centering recesses at the end of parts such as bars, which must for example be machined later on, on lathes, said recesses being used as points of support to be engaged by the ends of the centers and headstocks of said lathes.

Machines of the aforementioned type are known, in which the part to be centered is held by its end to be centered between two V-shaped gripping jaws which, when horizontally approaching each other, position said part so as it is ready to be centered i. e. they bring the axis of said part in coincidence with the axis of the drill which performs the centering operation.

These machines present serious drawbacks:

First of all, the opposite gripping jaws must be operated with a certain power, so as to lift the part to be centered and bring its axis in coincidence with that of the drill. This power must be increased as the weight of the part is increased, which results in a limitation, to a certain extent, of the size of the parts which can be formed with centering recesses.

In the second place, the alignment of the axis of the part, with that of the drill is not always precise, which renders the ultimate machining of the parts very difficult.

The machine according to the invention overcomes these drawbacks. Its purpose is to allow forming of centering recesses in parts of any length without having to take into account the force which is necessary for positioning such parts. The machine of the invention furthermore avoids the gripping stresses of the gripping jaws which are necessary for holding the parts to be drilled. On the other hand, the machine is so conceived that the coincidence of the axis of the part with that of the drill is precise under any circumstances.

To sum up, the invention provides a practical machine which is at the same time precise and economical and which furthermore occupies a small space, is strong, noiseless and avoids the breaking of drills.

Referring to the appended drawings, it will be seen that:

Fig. 1 is an end view of a centering machine according to the invention; and

Fig. 2 is a longitudinal cross-section of the machine of Fig. 1 along line II—II of Fig. 1.

In the example shown in the appended drawing the frame of the machine is indicated with numeral 1. On the horizontal table, supported by the frame 1, are fixed V-shaped upwardly directed gripping jaws 2 and 3 on which rests the part at the end of which the centering recess is to be formed. Over gripping jaw 2 is arranged an upper gripping jaw 4 which cooperates with the gripping jaw 2, arranged oppositely to the latter. The upper gripping jaw 4 is provided with two vertical columns 5 and 6 which can slide in appropriate bores formed in the lower gripping jaw 2. The vertical sliding of the gripping jaw 4 assures the gripping of the part to be centered which is brought into proper position without any particular effort. The bores are so arranged that the gripping jaw 4 can closely approach the gripping jaw 2 in order to allow the holding of parts of relatively small diameter.

The lower ends of the columns 5 and 6 are connected, by means of nuts 5a and 6a, with the ends 7a and 8a of arms 7 and 8 which are integral with a nut 9 (Fig. 2).

The nut 9 which is rigidly connected to the gripping jaw 4 constitutes one of the transmission elements which transmit motion between the gripping jaw 4 and the device supporting the drill 10. The initial position of drill 10 when positioned longitudinally is such that its axis is constantly located in the horizontal plane of symmetry of the gripping jaws 2 and 4. It will be evident from the following description that this relation is permanently obtained.

The nut 9 is in constant engagement with a threaded rod 11 which can swivel around its axis, the threaded rod 11 being restrained against vertical movement in relation to the horizontal table of the machine. The threaded rod 11 is connected to the table by means of a support 12. At the lower end of the rod 11 is mounted a control fly-wheel 13 which is coupled with an actuating lever 14.

It is evident that the rotation of the threaded rod 11 controls the vertical movement of the nut 9. In the position shown in Fig. 2, the nut 9 is in its uppermost position.

To the nut 9 is linked the end of a lever 15, the opposite end of which is linked to a fixed point of the machine frame. The ends of lever 15 are connected to the nut 9 and frame by means of identical small connecting rods 16 and 17. To the middle of the lever 15 is linked the lower end of a bar 18, the upper end of which is rigidly connected to the drill-holder. The drill-holder moves in any appropriate manner between vertical slides which can advantageously be integral with a pedestal 2a integral with the lower gripping jaw 2. The linking of the lower end of the bar 18 to the middle of the lever 15 determines the vertical displacement of the axis of the drill 10, and this displacement will be constantly equal to one half of the vertical displacement of the gripping jaw 4. Under such conditions, if the initial setting of the drill 10 in relation to the gripping jaws 2 and 4 is accurate, the proper position of drill 10 will be provided for any other positions of the gripping jaw 4, corresponding for example, to various parts of different diameters to be drilled.

The drill 10, the driving shaft 19 of which is driven by a pulley 20, must be constantly driven in rotation, whatever its position in relation to the horizontal table of the machine and whatever its position in relation to the vertical plane of the gripping jaws 2 and 4. According to the invention, there is provided a driving means which is very simple and efficient and which is arranged between the pulley 20 and the motor 21. To this effect, the motor 21 is mounted on a tilting platform 22 which can oscillate around an axle 23, suspended at the lower end of a tie-bar 24, the upper end of which is integral with the machine frame. The train of pulleys 25, 26 and 27 driven by the shaft of the motor is connected to the pulley 20 by means of a belt 28. The width of the pulley 20 will preferably be slightly larger than the total width of the train of pulleys 25, 26 and 27 plus a complementary width corresponding to the horizontal stroke which is necessary for the displacement of the drill as will be described below. Under such conditions the motor 21 is constantly suspended from the pulley 20 by means of the belt 28. Therefore, when the drill-holder is displaced vertically, the motor 21 will oscillate around the axis 23 and its own weight will be quite sufficient for tensioning the belt 28.

The oscillating end of the platform 22 is integral with a lever 29 which permits the motor 21 to be lifted manually, when one desires, for instance, to put the belt 28 on another pulley of the train of pulleys 25, 26 and 27 for obtaining various rotation speeds of the drill 10.

There is also provided according to the invention a drill-holder which can be fed and driven manually and which is of special type. To this effect the shaft 19 rests in a sleeve 30, coaxial with shaft 19 and in which the latter can freely rotate without being able to move longitudinally so that the longitudinal displacement of the sleeve 30 controls the longitudinal translation of the shaft 19. Around the sleeve 30 is arranged a case 31 at the lower end of which is introduced the upper end of the bar 18. Fixed to the sleeve 30 and extending radially from the latter is control lever 32 which controls the feed of the drill 10. The base 32a of lever 32 is guided in a groove which is preferably helical and which is arranged in the periphery of the case 31. This groove can, for example, extend along a portion of a helix of 90°. Lateral blades of case 31 which slidably engage the pedestal 2a which has been described above render the case 31 motionless during turning of sleeve 30 and render it motionless also during longitudinal translation of sleeve 30; thus the turning of the sleeve 30 which is controlled by the displacement of the base 32a in the aforementioned groove causes the relative displacement of said sleeve 30 and of the shaft 19, and consequently of the drill 10 in relation to the case 31. The pulley 20 having an appropriate width, the belt 28 constantly bears against it, whatever the longitudinal position of the drill 10.

It is of course understood that without departing from the principle of the present invention, modifications can be made to the embodiments which have just been described. One could for example separate the lower gripping jaw 2 from the vertical slides, thus allowing for vertical sliding of the case 31.

What we claim is:

1. Centering apparatus comprising, in combination, a pair of jaws defining a space therebetween and being mounted for movement toward and away from each other; drilling means located adjacent to said jaws and being mounted for movement in a direction substantially parallel to the direction in which said jaws move; and linkage means operatively connected to said jaws and drilling means for moving said drilling means with said jaws and for automatically locating said drilling means in alignment with the center of said space defined between said jaws.

2. Centering apparatus comprising, in combination, a stationary jaw; a movable jaw mounted for movement toward and away from said stationary jaw, said jaws defining a space therebetween; drill means located adjacent to said jaws and being mounted for movement in a direction parallel to the direction in which said movable jaw moves; and linkage means interconnecting said movable jaw and said drill means for moving the latter in response to movement of said movable jaw and for automatically locating said drill means centrally of said space defined by said jaws.

3. Centering apparatus comprising, in combination, a stationary jaw; a movable jaw mounted for movement in a first plane toward and away from said stationary jaw so that articles of different size may be gripped by said jaws; drilling means located adjacent to said jaws and being mounted for movement in a second plane parallel to said first plane; an elongated lever pivotally connected adjacent one end thereof to said movable jaw and being pivotally connected adjacent the other end thereof to a stationary part of the centering apparatus; and an elongated connecting member fixedly connected at one portion thereof to said drilling means and being pivotally connected at another portion thereof to the center of said elongated lever, whereby, when said movable jaw is moved, said drilling means is automatically moved through one half of the distance through which said movable jaw moves so that said drilling means is automatically located centrally of said jaws.

4. Centering apparatus comprising, in combination, a stationary jaw; a movable jaw mounted for movement in a first plane toward and away from said stationary jaw so that articles of different size may be gripped by said jaws; drilling means located adjacent to said jaws and being mounted for movement in a second plane parallel to said first plane; a substantially straight elongated lever pivotally connected adjacent one end thereof to said movable jaw and being pivotally connected adjacent the other end thereof to a stationary part of the centering apparatus; and an elongated connecting member extending in a direction parallel to said first and second planes, said connecting member being fixedly connected at one portion thereof to said drilling means and being pivotally connected at another portion thereof to the center of said elongated lever, whereby, when said movable jaw is moved, said drilling means is automatically moved through one half of the distance through which said movable jaw moves so that said drilling means is automatically located centrally of said jaws.

5. Centering apparatus comprising, in combination, a stationary jaw; a movable jaw mounted for movement in a first plane toward and away from said stationary jaw so that articles of different size may be gripped by said jaws; drilling means located adjacent to said jaws and being mounted for movement in a second plane parallel to said first plane; a substantially straight elongated lever pivotally connected adjacent one end thereof to said movable jaw and being pivotally connected adjacent the other end thereof to a stationary part of the centering apparatus; an elongated connecting member extending in a direction parallel to said first and second planes, said connecting member being fixedly connected at one portion thereof to said drilling means and being pivotally connected at another portion thereof to the center of said elongated lever, whereby, when said movable jaw is moved, said drilling means is automatically moved through one half of the distance through which said movable jaw moves so that said drilling means is automatically located centrally of said jaws; and driving means operatively connected to said drilling means for driving the same irrespective of the position of said drilling means along said second plane.

6. Centering apparatus comprising, in combination, a stationary jaw; a movable jaw mounted for movement in a first plane toward and away from said stationary jaw so that articles of different size may be gripped by said jaws; drilling means located adjacent to said jaws and being mounted for movement in a second plane parallel to said first plane; a substantially straight elongated lever pivotally connected adjacent one end thereof to said movable jaw and being pivotally connected adjacent the other end thereof to a stationary part of the centering apparatus; an elongated connecting member extending in a direction parallel to said first and second planes, said connecting member being fixedly connected at one portion thereof to said drilling means and being pivotally connected at another portion thereof to the center of said elongated lever, whereby, when said movable jaw is moved, said drilling means is automatically moved through one half of the distance through which said movable jaw moves so that said drilling means is automatically located centrally of said jaws; driving means operatively connected to said drilling means for driving the same irrespective of the position of said drilling means along said second plane; and moving means operatively connected to said drilling means for moving the same toward and away from said jaws.

References Cited in the file of this patent

UNITED STATES PATENTS

| Number | Name | Date |
|---|---|---|
| 579,037 | Bulock et al. | Mar. 16, 1897 |